United States Patent [19]

Gagliani et al.

[11] 4,296,208

[45] Oct. 20, 1981

[54] METHODS OF PREPARING POLYIMIDES AND POLYIMIDE PRECURSORS

[75] Inventors: John Gagliani; Usman A. K. Sorathia, both of San Diego, Calif.

[73] Assignee: International Harvester Company, Chicago, Ill.

[21] Appl. No.: 186,670

[22] Filed: Sep. 12, 1980

[51] Int. Cl.³ .......................... C08J 9/00; C08G 18/16
[52] U.S. Cl. ...................................... 521/77; 521/180; 521/185; 521/88; 526/70; 526/71; 528/125; 528/128; 528/229
[58] Field of Search ................. 528/229, 125, 128; 526/70, 71; 521/77, 180, 185

[56] References Cited

U.S. PATENT DOCUMENTS

| 2,187,877 | 1/1940 | Ferris et al. | 260/85 |
| 2,880,794 | 4/1959 | Marshall, Jr. | 159/48 |
| 2,902,223 | 9/1959 | Nyrop | 239/223 |
| 3,049,174 | 8/1962 | Marshall, Jr. | 159/4 |
| 3,489,725 | 1/1970 | Lucas | 576/71 |

Primary Examiner—Morton Foelak
Attorney, Agent, or Firm—LeBlanc, Nolan, Shur & Nies

[57] ABSTRACT

Methods of preparing polyimides and polyimide precursors from liquid resins containing tetracarboxylic acid esters and primary diamines which involve spray drying the resin.

18 Claims, 3 Drawing Figures

METHODS OF PREPARING POLYIMIDES AND POLYIMIDE PRECURSORS

The invention described herein was made in the performance of work under NASA Contract No. NAS9-15484 and is subject to the provisions of section 305 of the National Aeronautics and Space Act of 1958 (72 Stat. 435; 42 USC 2457).

Our invention relates to polyimides and, more particularly, to novel, improved methods for preparing polyimides and dry, particulate precursors which can be converted into polymers of that character.

One class of polymers that is receiving increasing attention as criteria for structural materials become more demanding from a variety of viewpoints is the family of compounds known as polyimides.

As a class, polyimides are extremely valuable materials because of their chemical inertness, strength, and temperature resistance. There are also certain classes of proprietary polyimides which have such additional advantages such as retention of strength and resiliency and flexibility at cryogenic temperatures; resistance to hydrolysis and ultraviolet degradation; capability of undergoing oxidative degradation without generating toxic products or smoke; a novel closed cell structure which suits them for applications in which they are in contact with moving parts; the capacity to be transformed into porous fibers and other shapes and into rigid panels, cushioning, thermal acoustical insulation and a host of other novel products. These polyimides are disclosed in, inter alia, U.S. Pat. Nos. 3,506,583 issued Apr. 14, 1970, to Boram et al; 3,726,831 and 3,726,834 issued Apr. 10, 1973, to Acle et al and Acle, respectively; 4,070,312 issued Jan. 24, 1978, to Gagliani et al; and Re 30,213 issued Feb. 12, 1980, to Gagliani and in pending U.S. patent applications Ser. Nos. 935,378 and 952,738 filed Aug. 21, 1978 (now U.S. Pat. No. 4,241,193 issued Dec. 23, 1980), and Oct. 19, 1978, by Gagliani and 186,668 filed Sept. 12, 1980, by Gagliani et al.

These proprietary polyimides are prepared by reacting 3,3',4,4'-benzophenonetetracarboxylic acid or a dianhydride of that acid with a lower alkyl alcohol to form a half ester of the acid and then adding one or more primary diamines to the half ester solution to form an essentially monomeric precursor. Dielectric, thermal, or microwave heating is employed to convert the precursor to a polyimide.

The general model for the chemical reactions which are effected in converting the precursor to a polyimide are shown below. The actual reactions are typically much more complex depending upon the number of diamines in the precursor.

Esterification:

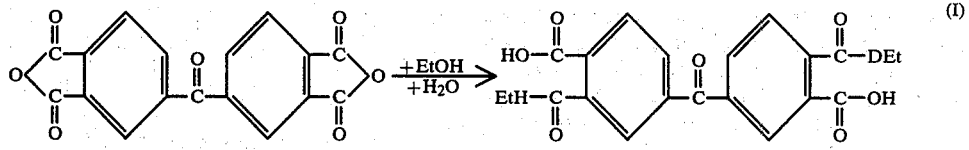

(I)

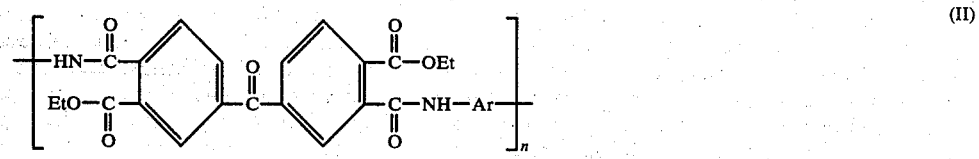

(II)

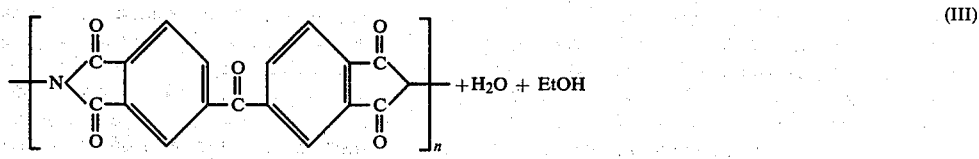

(III)

The material existing after dissolution of the diamines and the addition of any additives is what we term a "liquid resin". The material may be used in that form. However, in many cases—for example in making polyimide foams of the character described in U.S. Pat. No. Re. 30,213—it is often advantageous to first convert the precursor to a dry, particulate form. Ease of handling, as an example, is one advantage of the dry precursors.

Typically, this has heretofore been accomplished by heating the liquid resin in a circulating air oven at 65.6° to 87.8° C. (150° to 190° F.) for 12–16 hours. This is followed by drying in a vacuum oven at a temperature of 60.0° to 76.7° C. (140° to 170° F.) and an absolute pressure of 33.4 to 3.3 kPa (10 to 1.0 in. of Hg) for 60–120 minutes. Thereafter, the dried material is crushed, pulverized, and sieved.

The foregoing technique for converting the liquid resin to a dry, particulate precursor is time consuming and correspondingly expensive; the foams tend to be non-homogeneous; and the results are often not reproducible. Also, the time required for the drying steps makes it impractical to manufacture the particulate powder by continuous as opposed to batch-type processes. This is also an important economic drawback, especially in making precursors on a large scale.

We have now discovered that precursors of the character just described and, typically, of superior quality can be produced by employing a spray drying technique to transform the liquid tetracarboxylic acid ester/primary diamine resin into a dry powder. This technique has the additional advantage that, by varying a single process parameter, the properties of the materials into which the precursors are converted, such as the load deflection indentation of polyimide foams, can be optimized for particular applications.

Exemplary of the polyimides which can be prepared to advantage by the use of spray drying in accord with the principles of the present invention to make the precursors are the copolymers described in U.S. Pat. No. Re. 30,213 and the terpolymers described in copending application Ser. No. 186,668.

The patented copolymers are derived from precursors which, in their preferred forms, are essentially equimolar mixtures of a lower alkyl half ester of 3,3',4,4'-benzophenonetetracarboxylic acid and two diamines. One of the diamines is a heterocyclic diamine, and the other is an aromatic meta- or para-substituted diamine which is free of aliphatic moieties. A ratio of 0.4 to 0.6 mole of heterocyclic diamine per mole of 3,3',4,4'-benzophenonetetracarboxylic acid ester is preferred as this results in foams with optimal mechanical properties. However, as will become apparent hereinafter, precursors having a heterocyclic diamine/acid ester ratio of 0.3 have also successfully been employed.

The terpolyimides described in copending application Ser. No. 186,668 differ chemically from the copolyimides just described in that they are made from precursors which include an aliphatic diamine in addition to the aromatic and heterocyclic diamines employed in the copolyimide precursors.

From 0.05 to 0.3 mole of aliphatic diamine per 1.0 mole of benzophenonetetracarboxylic acid ester can be employed, and from 0.1 to 0.3 mole of heterocyclic diamine per mole of acid can be used.

Exemplary of the aromatic and heterocyclic diamines that can be employed in the just described copolyimides and terpolyimides are:
2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene Many other aromatic and heterocyclic diamines have been described in the open and patent literature dealing with the making of polyimides—see, for example, U.S. Pat. Nos. 3,179,614 issued Apr. 20, 1965, to Edwards; 3,575,891 issued Apr. 20, 1971, to LeBlanc et al; and 3,629,180 issued Dec. 21, 1971, to Yoda et al. Aromatic and heterocyclic diamines selected from those listed in the literature can also be utilized in copolyimides and terpolyimides of the character described above.

Aliphatic diamines having from three to 12 carbon atoms have been employed in the terpolyimides. However, diamines having no more than six carbon atoms will typically prove preferable. Also, aliphatic diamines with even number chains are preferred.

Aliphatic diamines we have used include:
1,3-diaminopropane
1,4-diaminobutane
1,6-diaminohexane
1,8-diaminooctane
1,12-diaminododecane
and Jeffamine 230. The latter is available from the Jefferson Chemical Company and has the formula:

$$H_2N-\underset{\underset{CH_3}{|}}{\overset{\overset{H}{|}}{C}}-\underset{\underset{H}{|}}{\overset{\overset{H}{|}}{C}}-\left[O-\underset{\underset{H}{|}}{\overset{\overset{H}{|}}{C}}-\underset{\underset{H}{|}}{\overset{\overset{CH_3}{|}}{C}}\right]_x-NH_2.$$

where x is approximately 2.6.

As discussed briefly above, the precursors of the polyimides with which we are concerned are prepared by first reacting 3,3',4,4'-benzophenonetetracarboxylic acid or, preferably, its dianhydride with an esterification agent to form an alkyl diester. Exemplary esterfying agents are methyl, ethyl, propyl, and isopropyl alcohols. Methanol is in many cases preferred because of its widespread availability, low cost, and other attributes; because its use facilitates conversion of the precursor to a polyimide foam which is important in applications involving the manufacture of that type of material; and because the foams made from the methyl esters tend to be more flexible, resilient, and compression set resistant.

Ethanol is also a preferred esterification agent.

The esterification reaction is followed by the addition of the diamine or diamines, which are dissolved in the reaction mixture. The temperature is kept below the reflux temperature of the esterification agent during dissolution of the diamines and low enough to avoid polymerization of the diamines and ester.

Graphite, glass, and other fibers as well as other fillers such as glass microballoons and additives such as crosslinking agents can be added to the resulting composition to impart wanted properties to the final product. A surfactant can also be added to increase fatigue resistance of the terpolyimide foam and to make it more flexible and resilient by increasing the bubble stability of the foam and the uniformity of the cellular structure.

One preferred surfactant is FS-B, a nonionic, fluorinated, polyalkylene copolymer manufactured by E. I. DuPont de Nemours and Company.

Other surfactants that have been successfully employed are FS-C, a nonionic surfactant of the same general chemical composition as FS-B and manufactured by the same company, and L-530, L-5410, and L-5430, which are silicone surfactants manufactured by Union Carbide Company. We employ from 0.01 to 1 percent of surfactant based on the weight of the ester and diamine constituents.

The liquid resin existing after dissolution of the diamines and the addition of any additives is transformed by spray drying in accord with the principles of the present invention into an amorphous, dry powder which is an essentially unpolymerized resinoid of one or more benzophenonetetracarboxylic acid half esters and one or more diamines (preliminary tests of one copolyimide precursor of the type described above, for example, indicated that the precursor had a chain length of about 20 to 30 molecules).

The amophorous, powdered, resinoid precursor can be converted into a monolithic, polyimide foam by various techniques including dielectric, thermal, and microwave heating. The latter, alone or with a thermal post-cure, is preferred because of the speed with which the foam can be developed and cured; because the foam is homogeneously heated; and because handling of the fragile, uncured foam can be avoided.

Microwave techniques and equipment that can be used to foam and cure the precursor are disclosed in copending application Ser. No. 186,629 filed Sept. 12, 1980.

Foaming-curing parameters that have proven satisfactory in converting 100 gram samples of representative precursors to flexible, resilient foams are two to 12 minutes exposure to high frequency radiation in an oven operating at a frequency of 2450 MHZ and at 5 KW power followed by thermal heating at a temperature of 500°–550° F. for 15 minutes to two hours.

The resulting foam can be employed as such—in a seat cushion or as insulation, for example. Or, using the procedure described in application Ser. No. 935,378 as a further example, the flexible, resilient polyimide foam can be converted to a dense, rigid, structurally strong, intumescent material by heating it under pressure. The foam can also be comminuted and used as a molding powder as described in U.S. Pat. No. 3,726,834.

From the foregoing it will be apparent to the reader that the primary object of the present invention resides in the provision of novel, improved methods of manufacturing polyimides and their precursors.

A related, also important and primary object of our invention resides in the provision of novel, improved processes for producing polyimide precursors in a dry particulate form from fluid mixtures of benzophenonetetracarboxylic acid esters and primary diamines.

Related, also important but more specific objects of our invention reside in the provision of methods for preparing such polyimide precursors:

which can be carried out on a continuous as opposed to batch-type basis;

which make the preparation of the precursors relatively inexpensive;

which afford ready control over the mechanical properties of the polyimides into which the precursors are converted;

which are useful in preparing a wide variety of precursors of the character identified above;

in which spray drying is employed to eliminate volatiles from the material being processed.

Other important objects and features and additional advantages of our invention will become apparent from the appended claims and as the ensuing detailed description and discussion of our invention proceeds in conjunction with the accompanying drawing in which:

Figure 1:
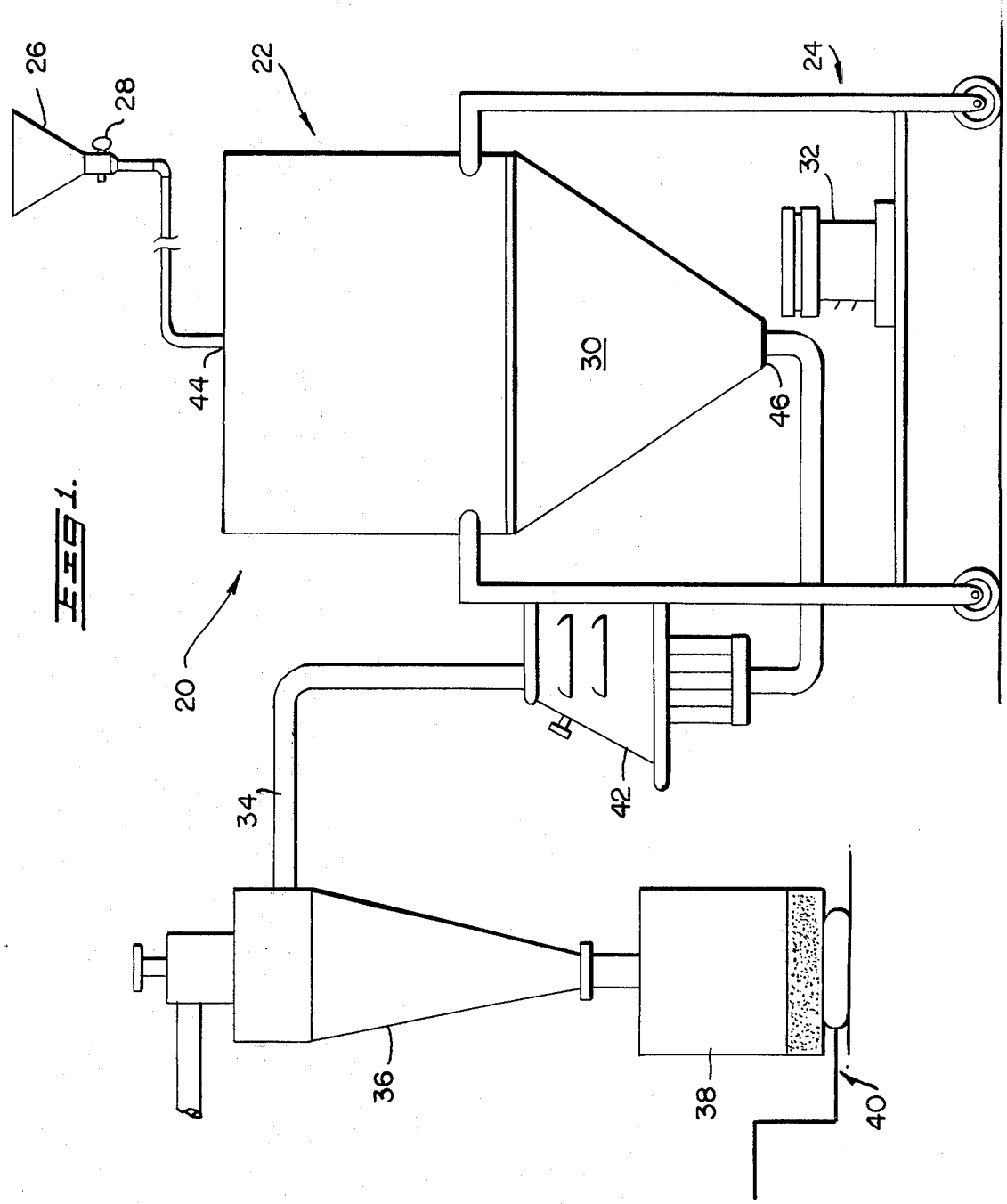
FIG. 1 is a schematic illustration of spray drying apparatus for transforming a fluid mixture into a dry, particulate polyimide precursor in accord with the principles of the present invention.
Figure 2:
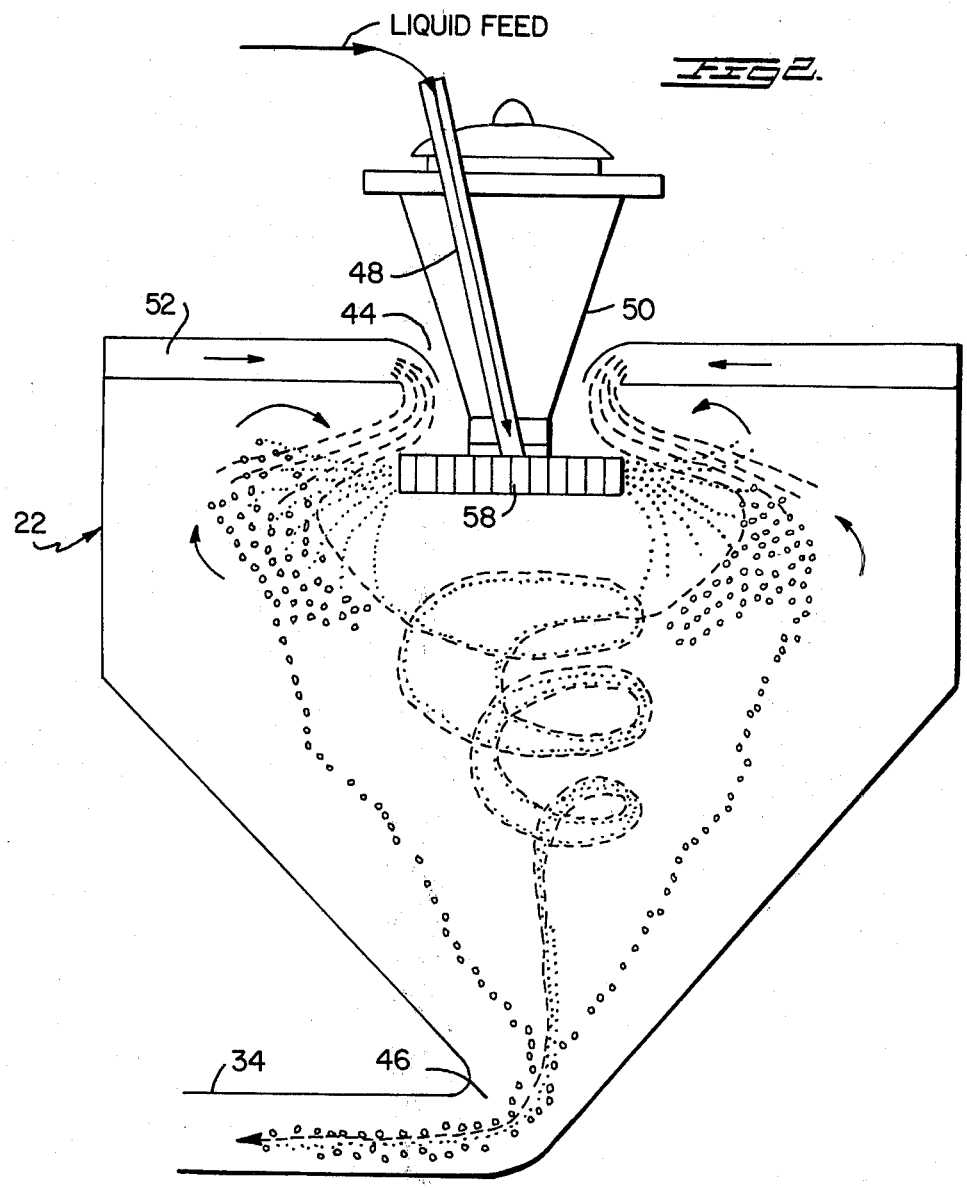
FIG. 2 is a schematic illustration of the operations in the reactor of the spray drying apparatus.

Referring now to the drawing, FIGS. 1 and 2 depict an exemplary spray drying system 20 for preparing powdered polyimide precursors in accord with the principles of the present invention.

For the most part, the components of system 20 are of conventional, commercially available construction. For that reason and because the details of the spray drying system are not part of the present invention, that system will be described herein only to the extent necessary for an understanding of the present invention.

The major components of system 20 include a Niro Mobile Minor reactor or spray dryer 22 mounted on a stand 24. Liquid resin feedstock flows to the spray dryer from a reservoir 26 through a valve 28 which can be adjusted to control the rate of flow.

Dry powder produced in spray dryer 22 migrates to the bottom of the dryer and is kept from sticking to the interior of spray dryer casing 30 by a timed impact vibrator 32 mounted on stand 24.

The dry powder flows through an offtake conduit 34 into a cyclone separator 36 where the powdered precursor is separated from air and evolved volatiles in which it is entrained and collected in a container 38.

Aside from the components just described, spray drying system 20 includes a schematically illustrated system 40 for supporting and shifting container 38, a control panel 42, and thermometers or other instruments (not shown) for measuring the temperature at the inlet 44 and outlet 46 of spray dryer 22 (see also FIG. 2).

As shown in FIG. 2, the liquid resin introduced into spray dryer 22 through feedstock conduit 48 is converted into an annular spray of droplets by a rotating wheel-type atomizer 50. These droplets are entrained in a swirling annulus of heated air as they are formed. The air flows radially inward into spray dryer 22 through a ceiling air disperser 52 at the top of the spray dryer and then downwardly around the rotating wheel 58 of atomizer 50.

The air is preferably supplied at constant pressure because variations in air pressure can cause fluctuations in the speed of wheel 50; and this will effect the characteristics of the dry, particulate precursor and the polyimide into which it is converted as will be discussed hereinafter.

The interaction between the heated air and the drops of liquid resin shown in FIG. 2 result in the drops being almost instantaneously dried. The resulting particles, entrained in the heated air and the solvent evolved from them, migrate downwardly to the lower end of spray dryer 22 and are discharged from the spray dryer through previously mentioned offtake conduit 34.

Because the evaporation of solvent from the liquid resin is accompanied by cooling of the droplets and because of the short residence time of the resin in the reactor, overheating of the precursor can be avoided; and more precise control over the drying process can be exercised than was possible using the prior art technique described above.

The system 20 illustrated in the drawing and just described is capable of producing dry, particulate polyimide precursors on a continuous basis, virtually without operator attention.

That our novel process for producing dry, particulate, polyimide precursors is highly efficacious was demonstrated by making such precursors in the spray drying apparatus described above from a liquid feedstock of the character with which we are concerned.

The feedstock was prepared by adding 3,3',4,4'-benzophenonetetracarboxylic acid dianhydride (322.23 g, 1.0 mole) to 240 ml of methyl alcohol and 24 ml of $H_2O$ in a one-liter, three neck flask equipped with a thermometer, a mechanical stirrer and a reflux condenser. After addition, the mixture was heated and refluxed until clear. The mixture was then refluxed for an additional 60 minutes to ensure complete esterification of the acid to its half ester.

The reaction mixture was then cooled to 40°–50° C. (104°–122° F.).

2,6 Diaminopyridine (32.8 g, 0.3 mole) and p-p'methylene dianiline (138.7 g, 0.7 mole) were added to the half ester solution, and the mixture was heated to 60°–65° C. (140°–149° F.) for five minutes.

FS-C surfactant was next added to the mixture in an amount of 0.1 percent based on the weight of the methyl half ester and the diamines.

The preparation of the liquid resin feedstock was completed by diluting the mixture with methyl alcohol in a ratio of 100 parts of half ester, diamines, and surfactant to 20 parts of alcohol (20 phr).

Next, the reactor was heated to temperatures of 100°, 110°, 120°, or 130° C. and the feedstock metered into the dryer. The feed rate was adjusted as necessary to keep the outlet temperature in a narrow range varying from 70°–80° to 80°–86.5° C. depending upon the run.

The dried powder was collected, sieved through a No. 48 Tyler mesh screen (297 micron diameter openings) and rolled for 30 minutes in a round plastic bottle to eliminate lumps.

The precursors thus obtained were converted to polyimide foams by using a Gerling Moore Batch Cavity Model 4115 microwave oven operating at a frequency of 2450 MHz and a power 5 KW.

The precursor was laid on a substrate, placed in the microwave cavity at room temperature, and exposed to the high frequency radiation for 2 to 12 minutes. The foam thus produced was then further processed (or cured) by heating it at 287.7° C. for 15 to 30 minutes in a circulating air oven.

Resiliency, density, and quality of the foam were measured. Resiliency was determined by the ball rebound method described in ASTM Standard D-1564, Suffix B, using a tester fabricated and calibrated by that procedure.

The results of the tests are summarized in Table 1.

The tabulated data demonstrate the importance of the spray drying parameters. For the particular chemical system involved in the tests, for example, spray dryer inlet temperatures of 100°–110° C. produced superior results.

The data summarized in Table 1 show that a more than three-to-one variation in the density of the polyimide product can be obtained by only moderate variations in the spray dryer outlet temperature. The data furthermore show that, within this range, the outlet temperature has a marked influence on the yield of both the precursor and the final product and on the quality of the latter.

Dryer outlet temperature is particularly important because of its direct influence on the volatiles content of the particulate precursor. Volatiles content increases with decreases in spray dryer outlet temperature and vice versa.

The volatiles content of the particulate precursor is the most important factor in the foaming of the precursor and, therefore, in the properties of the polyimide foam. Precursors with higher volatiles content produce foams with more open and larger cellular structures and lower density. Conversely, those precursors of lower volatiles content produce foams with less open, smaller cells and higher density.

TABLE I

| RUN NO. | INLET °C. | OUTLET °C. | Δt, °C. | AVERAGE FLOW RATE ml/min | POWDER BULK DENSITY g/cc | POWDER BULK DENSITY lbs/ft³ | FOAM PROPERTIES RESILIENCY | DENSITY lbs/ft³ | DENSITY kg/m³ | FOAM QUALITY |
|---|---|---|---|---|---|---|---|---|---|---|
| 21 | 110 | 80–86 | 30–24 | 22 | 0.238 | 14.9 | 60–70 | 1.21 | 19.4 | Poor |
| 22 | 110 | 80–74 | 30–36 | 54 | 0.352 | 22.0 | 60–70 | 0.86 | 13.8 | Good |
| 23 | 110 | 80–70 | 30–40 | 107 | 0.414 | 15.8 | 50–60 | 0.75 | 12.0 | Good |
| 24 | 120 | 80–86.5 | 40–33.5 | 335 | 0.200 | 12.5 | 50 | 1.38 | 22.1 | Poor |
| 25 | 120 | 80–75 | 40–45 | 80.8 | 0.368 | 23.0 | 50–60 | 0.67 | 10.7 | Good |
| 26-R | 120 | 80–76 | 40–44 | 58.4 | 0.329 | 20.5 | 50 | 0.66 | 10.6 | Poor |
| 27 | 130 | 80–88 | 50–42 | 48 | 0.198 | 12.4 | 50–60 | 1.52 | 24.3 | Poor |
| 28 | 130 | 80–77 | 50–53 | 83.3 | 0.241 | 15.0 | 50–60 | 1.06 | 17.0 | Poor |
| 29 | 130 | 80–74 | 50–56 | 90.4 | 0.343 | 21.4 | 60–70 | 0.59 | 9.5 | Good |
| 30 | 100 | 80–74 | 20–26 | 35.8 | 0.326 | 20.3 | 60–70 | 0.88 | 14.1 | Good |
| 31 | 100 | 80–70 | 20–30 | 60.9 | 0.413 | 25.8 | 60–70 | 0.95 | 15.2 | Fair–Good |
| 32 | 100 | 80–79 | 20–21 | 23.8 | 0.241 | 15.0 | 50 | 0.88 | 14.1 | Poor |

Density of the polyimide foam is important because most physical properties of a polymeric foam approach a straight-line relationship to density. Among the important properties of which this is true are indentation load deflection and compression set.

Indentation load deflection (ILD) is a measure of the force required to compress a polymeric foam to a specified percentage of its original thickness. ILD is accordingly indicative of the softness or seatability of a foam.

Compression set is the permanent deformation obtained by subjecting a foam to a specified compressive stress (load and time). Compressive set is also indicative of the seatability of a foam and, in addition, is a measure of its durability.

The data in Table 1 show the substantial effect that spray dryer outlet temperature consequently has on ILD and compression set.

The data further show that, when correlated with the spray dryer or reactor inlet temperature, spray dryer outlet temperature can be so controlled as to simultaneously optimize yield and foam quality and produce optimum cellular structure.

To further demonstrate that spray dryer outlet temperature is consequential, that variations in that parameter can be utilized to control the properties of the polyimide product into which the precursor is converted, and that our process is equally useful in making precursors for other polyimides, terpolymers of the character identified above were prepared by forming the methyl half ester of 3,3',4,4'-benzophenonetetracarboxylic acid in the manner described above. The half ester solution was cooled to 25°–35° C. (77°–95° F.) and 2,6 diaminopyridine (32.8 g, 0.3 mole) and p-p'-methylene dianiline (99.1 g, 0.5 mole) were added and the contents of the flask mixed for 15 minutes. 1,6 Diaminohexane (23.7 g, 0.2 mole) was then added at a slow enough rate to keep the reaction temperature from exceeding 65° C. (149° F.).

FS-C surfactant (0.1 weight percent) was added to the mixture, the latter diluted with 30 phr of methyl alcohol, and the resulting liquid resin feedstock spray dried in the same reactor operated at an inlet temperature of 100° C. and outlet temperatures in the range of 58°–63° to 75°–80° F. The outlet temperature was again controlled by regulating the rate-of-flow of the feedstock through the reactor or spray dryer.

The dry powder was processed and converted to a polyimide foam as described above, and various parameters which this test was designed to characterize were measured. The results of this series of tests are tabulated in the following table (Table 2).

Figure 3:
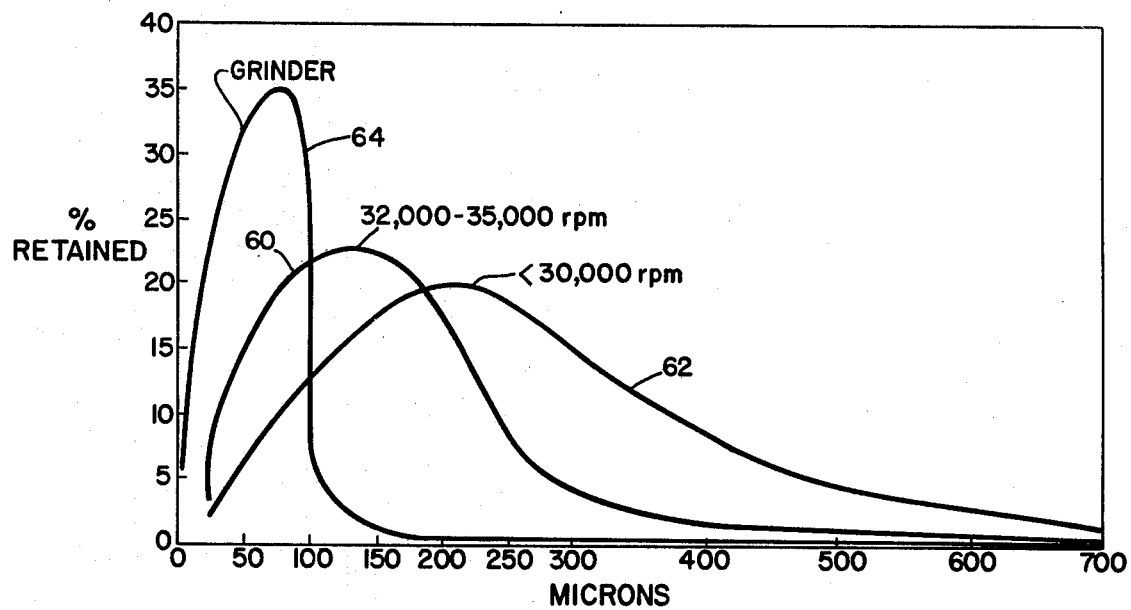
FIG. 3 shows, graphically, the effect on the precursor of certain variations in the spray drying process.

Exemplary particle size distributions obtained in the tests under discussion are shown in FIG. 3. Curve 60 shows that operation of the atomizer in the preferred 32,000–35,000 rpm range produced an optimum particle size distribution. Curves 62 and 64 show that precursors prepared by operating the atomizer at a slower speed and by employing grinding had much less useful particle size distributions.

Other results of exemplary tests in the series just described are tabulated below.

TABLE 3

| Maximum Particle Size Tyler Mesh (microns) | Indentation Load Deflection | | | | Foam Quality |
|---|---|---|---|---|---|
| | 25% | | 65% | | |
| | N | (lbf) | N | (lbf) | |
| #24 (707) | 138 | 39 | 534 | 120 | Good Cellular Structure |
| #48 (297) | 245 | 55 | 1076 | 242 | Rigid Structure |
| Pulverized (<297 microns) | 267 | 60 | 1054 | 237 | Rigid Structure large flaws |

TABLE 2

| FOAM NO. | INLET TEMPERATURE (°C.) | OUTLET TEMPERATURE (°C.) | POWDER YIELD | | POWDER PRECURSOR VOLATILE CONTENT (%) | FOAM YIELD ROUGH CUT (%) | DENSITY | | TYPE OF FOAM |
|---|---|---|---|---|---|---|---|---|---|
| | | | kg/h | lbs/h | | | kg/m³ | lbs/ft³ | |
| 45–62 | 100 | 58–63 | wet powder | | — | 10 | 7.2 | 0.45 | Excessive Reticulation |
| 68–78 | 100 | 63–67 | 2.9 | 6.4 | 21.4 | 82 | 10.2 | 0.64 | Good. Moderate Reticulation |
| 77–87 | 100 | 67–70 | 2.3 | 5.0 | 20.7 | 65 | 20.0 | 1.25 | Good. Some Reticulation |
| 70–80 | 100 | 70–75 | 1.7 | 3.8 | 19.2 | 47 | 22.2 | 1.39 | Fair. Striations present |
| 46–63 | 100 | 75–80 | 0.64 | 1.4 | 19.0 | 35 | 25.6 | 1.60 | Poor. Full of voids |

The effect of dryer outlet temperature on yield of precursor and terpolyimide foam, on foam density, and on the character of the foam are all noteworthy.

The foregoing, and other series of tests, also demonstrated that atomizer speed is an important parameter in the practice of our invention, that it has a pronounced effect on particle size, and that precursor particle size has a marked effect on the properties of the polyimide foam into which it is converted.

One set of tests in which this was demonstrated involved spray dryer system 20 and a liquid terpolyimide resin containing 3,3',4,4'-benzophenonetetracarboxylic acid methyl ester, 2,6-diamino pyridine, p,p'-methylene dianiline, and 1,3-diamino propane in a mole ratio of 1.0:0.3:0.6:0.1 with a 30 phr dilution ration of methanol.

Atomizer speeds below 30,000 rpm proved unsatisfactory because of incomplete atomization of the liquid resin and consequent generation of a wet powder.

Speeds of 37,000 and 40,000 rpm similarly proved unsatisfactory. This produced procursors with small particle sizes, and these yielded polyimide foams with flaws and unwanted, rigid, cellular structures.

Atomizer speeds in the range of 32,000–35,000 rpm followed by screening through a 24 Tyler mesh screen produced precursors which could be converted into high quality foams with good mechanical properties.

These tests also demonstrated that grinding to reduce the size of large particles can prove unsatisfactory because of the large proportion of fines this generates.

The tabulated data make it clear that, by virtue of its effect on the particle size of the precursor, the operating speed of the atomizer has a marked effect on indentation load deflection as well as the quality of the polyimide foam.

The foams identified in Table 3 were produced by foaming and curing the precursor on TEFLON coated glass (type 7267/114) in a 15 KW microwave oven using a powder loading of 15 KG (33 pounds) at a thickness of 6.35 cm (2.5 inches).

The "pulverized" precursor was produced in a Pulvette bench model grinder.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by United States Letters Patent is:

1. A method of preparing a dry, foamable, particulate precursor which can be converted into a polyimide by heating it, said method comprising the steps of: forming a primary diamine, 3,3',4,4'-benzophenonetetracarboxylic acid ester solution by dissolving one or more such diamines and the aforesaid acid or an anhydride thereof in a lower alkyl alcohol, atomizing said solution, and drying the droplets obtained by atomizing the diamine, ester solution with a heated gas.

2. A method of preparing a polyimide precursor as defined in claim 1 in which the atomized droplets of diamine, ester solution are dried in a chamber having an inlet and an outlet for a heated gas and in which the inlet temperature of said gas is maintained in the range of 100°-110° C. and the outlet temperature thereof is limited to a maximum of 80° C.

3. A method of preparing a polyimide precursor as defined in claim 1 wherein the outlet temperature of said gas is controlled by regulating the rate of feed of the diamine, ester solution to the chamber in which it is dried.

4. A method of preparing a polyimide precursor as defined in claim 1 wherein the gas with which the atomized droplets of the diamine, ester solution are dried is introduced into said chamber around, and in entraining relationship with, said droplets.

5. A method of preparing a polyimide precursor as defined in claim 1 wherein said diamine, ester solution is diluted with from 20 to 30 parts of alkyl alcohol per 100 parts of solution prior to atomizing said solution.

6. A method of preparing a polyimide precursor as defined in claim 1 wherein atomization of the diamine, ester solution is effected with a rotary type atomizer and wherein the atomizer is operated at a speed in the range of 32,000 to 35,000 rpm.

7. A method of preparing a polyimide precursor as defined in claim 1 wherein the dried particulate material is screened through a 24-48 mesh (Tyler) screen to generate a lump-free powder of sufficiently large particle size to be processable into a polyimide foam with a relatively homogeneous cellular structure.

8. A method of preparing a polyimide which includes the steps of making a precursor by a process as defined in any of the preceding claims 1-7 and converting the precursor to a polyimide by the application of heat.

9. A method of preparing a polyimide which includes the steps of: forming a half ester of 3,3',4,4'-benzophenonetetracarboxylic acid by reacting said acid or an anhydride thereof with a lower alkyl alcohol; dissolving one or more primary diamines in the half ester, alcohol solution; spray drying the material thus formed to convert it into a dry particulate polyimide precursor; and converting the precursor to a polyimide by heating it.

10. A method of preparing a polyimide foam as defined in claim 9 in which the diamine, ester solution also includes a surface active agent in an amount ranging from 0.01 to 1 percent based on the weight of the ester and diamine or diamines.

11. A method of preparing a polyimide foam as defined in claim 9 wherein the 3,3',4,4'-benzophenonetetracarboxylic acid ester and the diamine constituent are present in said diamine, ester solution in amounts such that the imide forming functionalities are substantially equimolar.

12. A method of preparing a polyimide foam as defined in claim 9 in which the diamine, ester solution contains a plurality of diamines, one of said diamines being heterocyclic and having nitrogen in the ring, another of said diamines being a para- or meta-substituted aromatic diamine which is free of aliphatic moieties, and any additional diamine being either a heterocyclic or an aromatic diamine as aforesaid.

13. A method of preparing a polyimide foam as defined in claim 12 wherein said heterocyclic diamine is present in said solution in a ratio of 0.4 to 0.6 mole of diamine per mole of 3,3',4,4'-benzophenonetetracarboxylic acid ester.

14. A method of preparing a polyimide foam as defined in claim 9 wherein the diamine, ester solution contains at least three diamines, one of said diamines being heterocyclic and having nitrogen in the ring, another of said diamines being a para- or meta-substituted aromatic diamine which is free of aliphatic moieties, and a third of said diamines being aliphatic.

15. A method of preparing a polyimide foam as defined in claim 14 in which the diamine, ester solution contains from 0.05 to 0.3 mole of aliphatic diamine and from 0.1 to 0.3 mole of heterocyclic diamine per mole of 3,3',4,4'-benzophenonetetracarboxylic acid ester.

16. A method of preparing a polyimide foam as defined in claim 14 wherein the aliphatic diamine in the diamine solution has from three to twelve carbon atoms.

17. A method of preparing a polyimide foam as defined in claim 14 wherein the aliphatic diamine in the diamine, ester solution has the formula

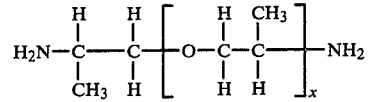

where x is on the order of 2.6.

18. A method of preparing a polyimide foam as defined in either of the preceding claims 12 or 14 wherein the heterocyclic and aromatic diamines are selected from the group consisting of:
2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene.

* * * * *

UNITED STATES PATENT AND TRADEMARK OFFICE
CERTIFICATE OF CORRECTION

PATENT NO. : 4,296,208
DATED : October 20, 1981
INVENTOR(S) : John Gagliani and Usman A.K. Sorathia It is certified that error appears in the above-identified patent and that said Letters Patent are hereby corrected as shown below:

Formula (I), right hand column, change "DEt" to --OEt--.

Column 4, line 32-33, change "esterfying" to --esterification--.

Signed and Sealed this

Twenty-third Day of February 1982

[SEAL]

Attest:

GERALD J. MOSSINGHOFF

Attesting Officer — Commissioner of Patents and Trademarks